(12) United States Patent
Methe et al.

(10) Patent No.: US 11,621,451 B2
(45) Date of Patent: *Apr. 4, 2023

(54) REMOVABLE TAB AND BATTERY ASSEMBLY HAVING THE SAME

(71) Applicant: DURACELL U.S. OPERATIONS, INC., Wilmington, DE (US)

(72) Inventors: Jean Mary Methe, Bethel, CT (US); David Goldfarb, Bethel, CT (US); David N. Klein, Bethel, CT (US)

(73) Assignee: DURACELL U.S. OPERATIONS, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/374,469

(22) Filed: Jul. 13, 2021

(65) Prior Publication Data
US 2022/0029227 A1    Jan. 27, 2022

Related U.S. Application Data

(62) Division of application No. 15/606,543, filed on May 26, 2017, now Pat. No. 11,101,514.

(51) Int. Cl.
*H01M 50/153*    (2021.01)
*C09J 7/10*    (2018.01)
(Continued)

(52) U.S. Cl.
CPC ............. *H01M 50/153* (2021.01); *C09J 7/10* (2018.01); *H01M 12/06* (2013.01);
(Continued)

(58) Field of Classification Search
CPC .. H01M 12/06; H01M 2/0222; H01M 2/0404; H01M 2/0452; H01M 2/0465;
(Continued)

(56) References Cited

U.S. PATENT DOCUMENTS

D270,807 S    10/1983    Dilliner
4,649,090 A    3/1987    Oltman et al.
(Continued)

FOREIGN PATENT DOCUMENTS

CN    105024112 A    11/2015
DE    19724648 A1    12/1998
(Continued)

OTHER PUBLICATIONS

Chinese Patent Application No. 201880034818.1, First Office Action, dated Dec. 31, 2021.
(Continued)

*Primary Examiner* — Mayla Gonzalez Ramos
(74) *Attorney, Agent, or Firm* — Marshall, Gerstein & Borun LLP

(57) ABSTRACT

A battery assembly includes a battery that has a top surface surrounded by a circumferential edge; and a removable tab attached to the top surface. The removable tab includes a first tab end and an oppositely disposed second tab end; a gripping region disposed adjacent to the first tab end; and a battery cell attachment region disposed adjacent to the second tab end and attached to the top surface of the battery. The battery cell attachment region has first and second oppositely disposed sidewalls, wherein the second tab end is curved inwardly away from the circumferential edge of the battery such that a portion of the top surface of the battery is exposed between the second tab end and the circumferential edge of the battery

20 Claims, 10 Drawing Sheets

(51) Int. Cl.

| | |
|---|---|
| *H01M 50/109* | (2021.01) |
| *H01M 50/147* | (2021.01) |
| *H01M 50/155* | (2021.01) |
| *H01M 50/598* | (2021.01) |
| *H01M 50/148* | (2021.01) |
| *H01M 12/06* | (2006.01) |
| *H01M 50/216* | (2021.01) |
| *H01M 50/256* | (2021.01) |

(52) U.S. Cl.
CPC ....... *H01M 50/109* (2021.01); *H01M 50/147* (2021.01); *H01M 50/155* (2021.01); *H01M 50/1537* (2021.01); *H01M 50/216* (2021.01); *H01M 50/256* (2021.01); *H01M 50/598* (2021.01); *C09J 2203/33* (2013.01); *C09J 2301/302* (2020.08); *C09J 2301/308* (2020.08); *C09J 2433/00* (2013.01)

(58) Field of Classification Search
CPC ............. H01M 2/0478; H01M 2/1005; H01M 2/1038; H01M 2/344; C09J 2203/33; C09J 2203/334; C09J 2201/122; C09J 2201/28; C09J 2201/622; C09J 7/29
See application file for complete search history.

(56) References Cited

U.S. PATENT DOCUMENTS

| | | | |
|---|---|---|---|
| 5,672,402 A | 9/1997 | Kreckel et al. | |
| 6,329,095 B1 * | 12/2001 | Farnworth | H01M 8/04201 |
| | | | 429/163 |
| D553,675 S | 10/2007 | Hogg | |
| 7,405,014 B2 | 7/2008 | Bartling et al. | |
| 7,563,531 B2 | 7/2009 | Bartling et al. | |
| D690,351 S | 9/2013 | Sato et al. | |
| D774,202 S | 12/2016 | Bielitz | |
| D788,703 S | 6/2017 | Krysinski et al. | |
| 10,093,469 B2 | 10/2018 | Dorr et al. | |
| 11,038,229 B2 | 6/2021 | Methe et al. | |
| 2002/0114911 A1 | 8/2002 | Franck et al. | |
| 2005/0103680 A1 | 5/2005 | Nakatsu et al. | |
| 2005/0136322 A1 | 6/2005 | Bartling et al. | |
| 2006/0292427 A1 * | 12/2006 | Bartling | H01M 12/06 |
| | | | 429/514 |
| 2012/0312833 A1 | 12/2012 | Gabathuler | |
| 2013/0015197 A1 | 1/2013 | Gauthier | |
| 2015/0027920 A1 | 1/2015 | Riordan | |
| 2016/0329536 A1 | 11/2016 | Dorr et al. | |
| 2017/0158918 A1 * | 6/2017 | Jozuka | C08L 93/00 |

FOREIGN PATENT DOCUMENTS

| | | |
|---|---|---|
| JP | S58078570 U | 5/1983 |
| JP | S62142165 U | 9/1987 |
| JP | H05006686 U | 1/1993 |
| JP | H05121057 A | 5/1993 |
| JP | 2004103436 A | 4/2004 |
| JP | 2017-075231 A | 4/2017 |
| JP | 2020-522085 A | 7/2020 |
| WO | WO-98/49063 A2 | 11/1998 |
| WO | WO-02/33774 A2 | 4/2002 |
| WO | WO-2004/021471 A1 | 3/2004 |
| WO | WO-2016/172676 A1 | 10/2016 |

OTHER PUBLICATIONS

Japanese Patent Application No. 2019-558504, Notice of Reasons for Refusal, dated Dec. 21, 2021.
International Application No. PCT/US2018/030654, International Search Report and Written Opinion, dated Aug. 13, 2018.
Duracell EasyTab Hearing Aid Batteries, downloaded from the Internet at: <https://www.duracell-me.com/products/hearing-aid-batteries/> (applicant admitted prior art).
van Kuilenburg et al., A review of fingerpad contact mechanics and friction and how this affects tactile perception, J. Engineering Tribology, 229(3):243-258 (2015).
Office Action for U.S. Appl. No. 15/606,585, dated Apr. 2, 2019.
Office Action for U.S. Appl. No. 15/606,585, dated Oct. 4, 2019.
Office Action for U.S. Appl. No. 15/606,585, dated May 8, 2020.
https://www.youtube.corn/watch?v=alqn61yoe2g.; Duracell Hearing Aid Batteries, Youtube, Oct. 15, 2014 (Year: 2014).
Office Action for U.S. Appl. No. 15/606,543, dated May 31, 2019.
Office Action for U.S. Appl. No. 15/606,543, dated Dec. 11, 2019.
Office Action for U.S. Appl. No. 15/606,543, dated Oct. 6, 2020.
Chinese Patent Application No. 201880034818.1, Decision on Rejection, dated Aug. 24, 2022.

* cited by examiner

REMOVABLE TAB AND BATTERY ASSEMBLY HAVING THE SAME

BACKGROUND

Field of the Disclosure

The disclosure generally relates to removable tabs for batteries and battery assemblies having the same, and more particularly to a removable tab that facilitates exposure of a portion of the top surface of the battery.

BRIEF DESCRIPTION OF RELATED TECHNOLOGY

Over the last 15 years, the number of individuals with hearing loss has nearly doubled. Many suffering from hearing loss are elderly, and, hand function decreases with age in both men and women, especially after age 65. This loss of hand function can make it more difficult to replace hearing aid batteries, even with the use of tabs such as EasyTab® (Duracell U.S. Operations, Inc.), which are relatively long tabs that are adhered to the batteries to facilitate handling by consumers. Conventional hearing aid tabs, such as EasyTab®, are typically attached to the battery such that the entire top surface of the battery is covered by and adhered to the tab. Despite the fact that the relatively long tab facilitates insertion of the battery by the consumer into the hearing aid, inserting the battery in the hearing aid continues to present handling challenges, including frequent inadvertent dropping of the batteries and associated tabs, and thus can cause significant consumer frustration, particularly for elderly consumers.

SUMMARY

The invention provides a battery tab structured and arranged for facilitating removal of the tab from the battery once the battery is placed in its desired position, such as in a hearing aid.

In accordance with an embodiment of the disclosure, a battery assembly includes a battery that has a top surface surrounded by a circumferential edge; and a removable tab attached to the top surface. The removable tab includes a first tab end and an oppositely disposed second tab end; a gripping region disposed adjacent to the first tab end; and a battery cell attachment region disposed adjacent to the second tab end and attached to the top surface of the battery. The battery cell attachment region has first and second oppositely disposed sidewalls and the second tab end is disposed inwardly away from the circumferential edge of the battery such that a portion of the top surface of the battery is exposed between the second tab end and the circumferential edge of the battery.

In accordance with another embodiment, a removable tab includes a first tab end and an oppositely disposed second tab end; a gripping region disposed adjacent to the first tab end; and a battery cell attachment region disposed adjacent to the second tab end and attached to the top surface of the battery. The battery cell attachment region having first and second oppositely disposed sidewalls and the second tab end is disposed inwardly away from the circumferential edge of the battery such that a portion of the top surface of the battery is exposed between the second tab end and the circumferential edge of the battery.

DETAILED DESCRIPTION

Figure 1:
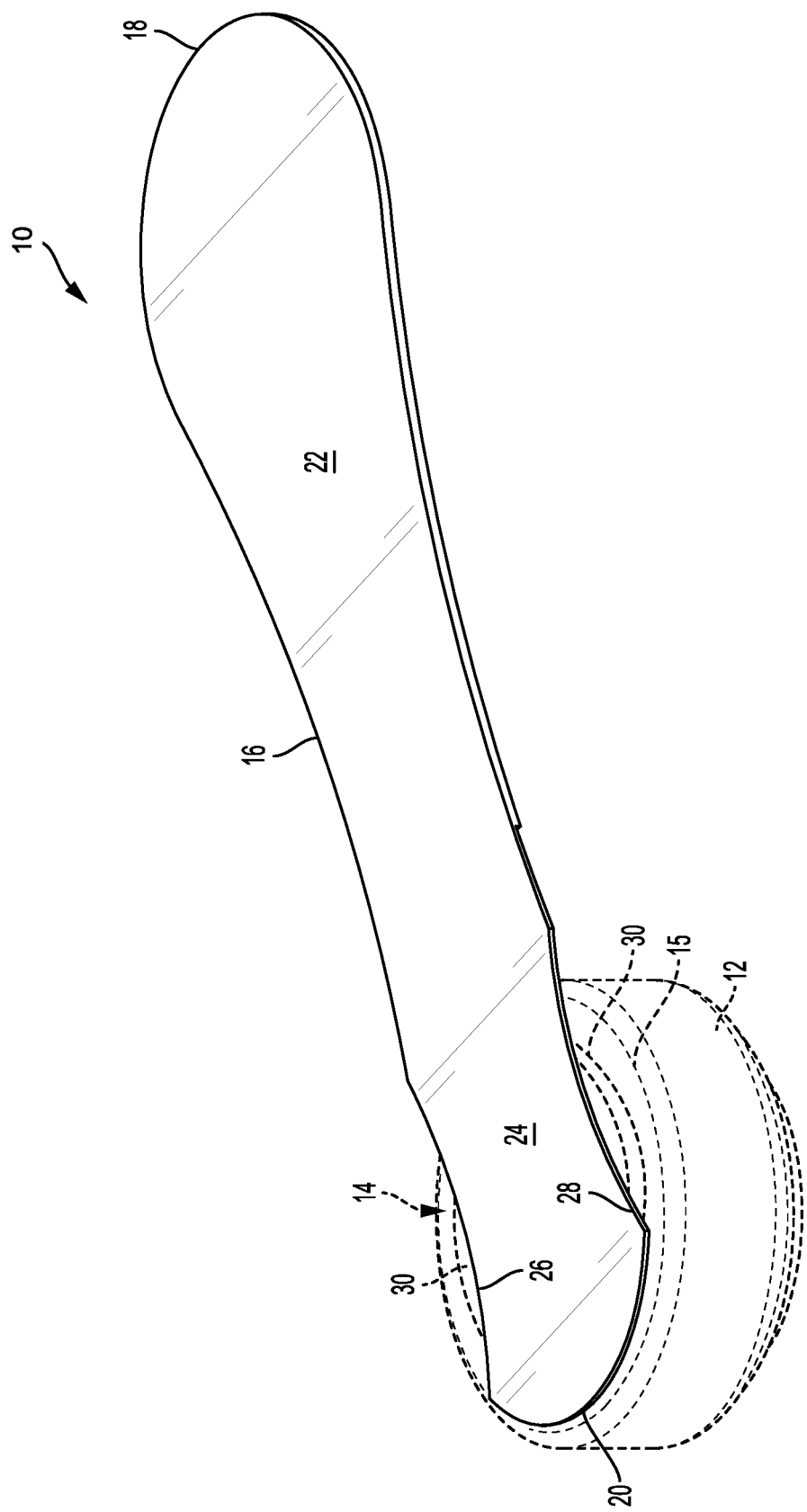
FIG. 1 is a perspective view of a battery assembly in accordance with an embodiment of the disclosure.
Figure 2:
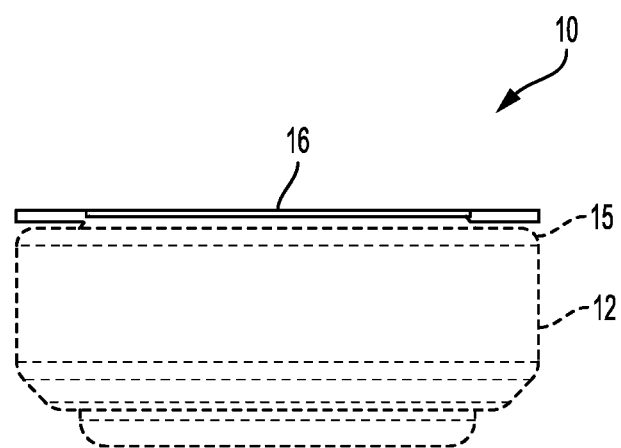
FIG. 2 is a front view of a battery assembly in accordance with an embodiment of the disclosure.
Figure 3:
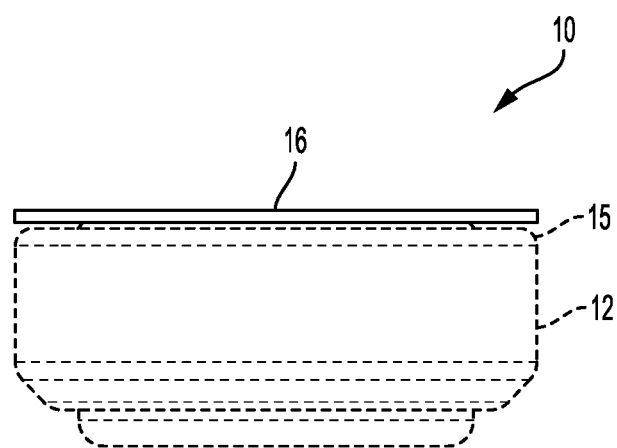
FIG. 3 is a rear view of a battery assembly in accordance with an embodiment of the disclosure.

Referring to FIG. 1, a battery assembly 10 in accordance with an embodiment of the disclosure includes a battery 12 having a top surface 14 and a removable tab 16 attached to the top surface 14 of the battery 12.

The removable battery tab 16 disclosed herein can be utilized with any suitable battery type and/or size. For example, the battery can be a hearing aid battery. In one aspect, the hearing aid battery is a metal/air battery, for example, the hearing aid battery can be a zinc air button cell. Additionally, as is known in the art, button cells come in a variety of sizes. Dimensions of the removable tab 16 can be adjusted depending on the size of the battery to which it is attached. Such adjustment can include modification of the width and/or length of the battery attachment region of the tab. Additionally, or alternatively, the overall tab length can be adjusted as needed depending on the battery size. In accordance with embodiments of the disclosure, a battery assembly is provided, including the battery and a removable tab. In accordance with other embodiments, a removable tab is provided for subsequent attachment to a battery.

Figure 4:
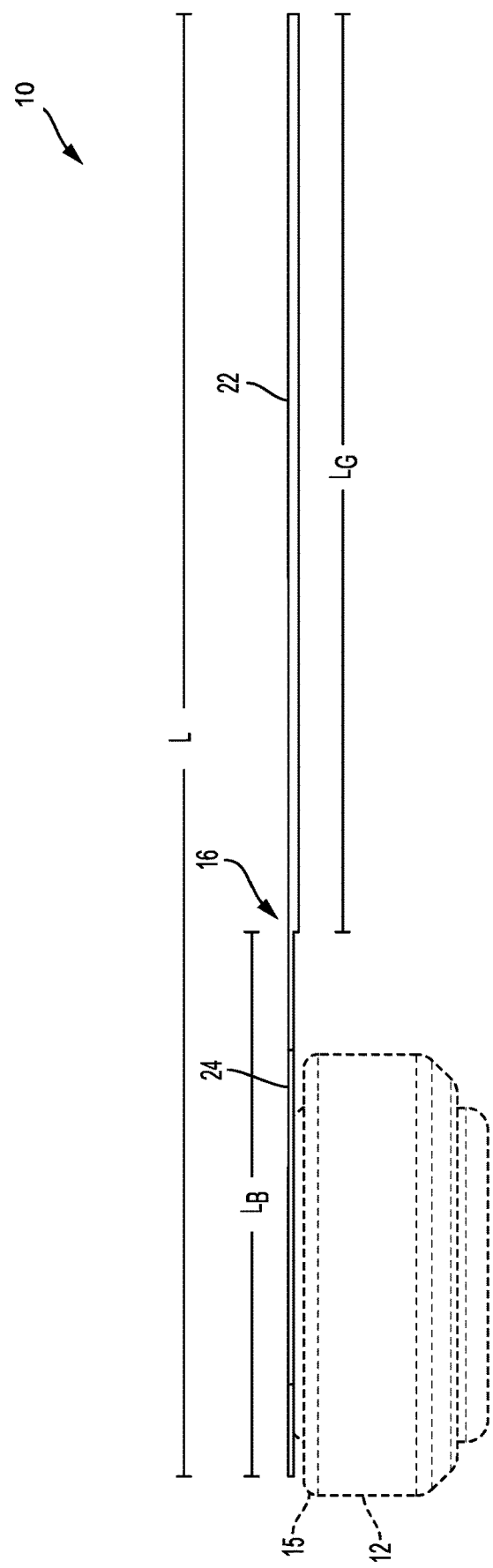
FIG. 4 is a side view of a battery assembly in accordance with an embodiment of the disclosure.
Figure 6:
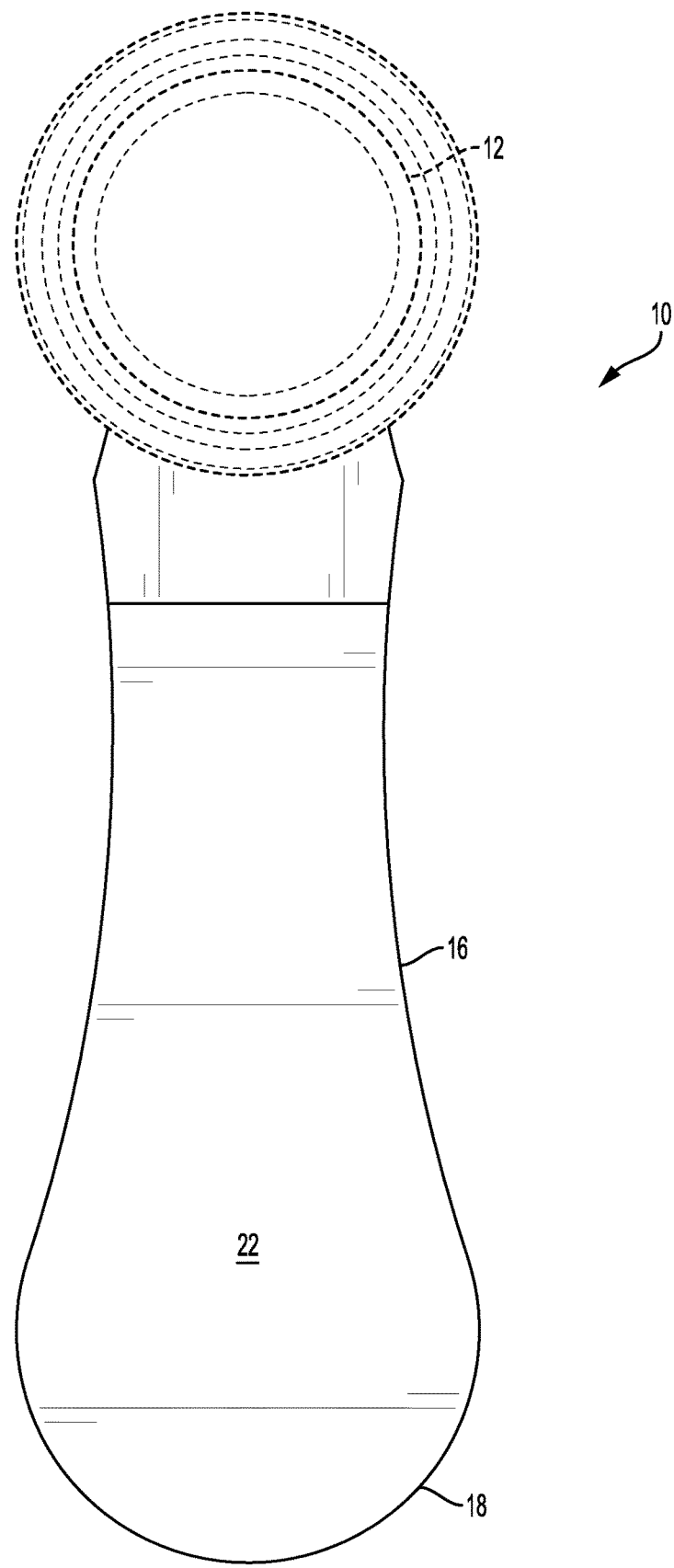
FIG. 6 is a bottom view of a battery assembly in accordance with an embodiment of the disclosure.

Referring to FIG. 1, the battery 12 includes the top surface 14 surrounded by a circumferential edge 15. The removable tab 16 includes a first tab end 18 and an oppositely disposed second tab end 20. The removable tab 16 includes a gripping region 22 disposed adjacent to the first tab end 18 and a battery cell attachment region 24 disposed adjacent to the second tab end 20. The gripping region 22 is a portion of the removable tab 16 that is not coextensive with the battery cell attachment region 24. More specifically, the gripping region 22 does not overlap with any portion of the removable tab that is coextensive with the first surface 14 of the battery 12. The battery cell attachment region 24 is attached to or adapted to be attached to the top surface 14 of the battery 12. The battery cell attachment region 24 of the tab 16 includes first and second oppositely disposed sidewalls 26, 28. At least one of the sidewalls 26, 28 is disposed inwardly from the circumferential edge 15 of the battery 12 such that a portion 30 of the top surface 14 of the battery is exposed between the edge 26, 28, 29 of the tab 16 and the circumferential edge 15 of the battery 12. In the illustrated embodiment, both sidewalls 26, 28 are curved inwardly from the circumferential edge 15 of the battery 12 such that a portion 30 of the top surface 14 of the battery is exposed between the edge 26, 28, 29 of the tab 16 and the circumferential edge 15 of the battery 12. Other non-curved means of disposing the edge 26, 28, 29 inwardly away from the circumferential edge 15 are also contemplated herein. For example, the edge 26, 28, 29 can have a substantially linear edge, with the linear sidewall edge being disposed inwardly away from the circumferential edge 15. The exposed surface 30 advantageously provides a region that the user can depress to maintain the battery 12 in the desired location while concurrently applying a peel force to remove the tab 16 from the battery 12. Referring to FIGS. 4 and 6, the gripping region 22 is parallel to the plane of the top surface 14 of the battery 12.

Figure 5:
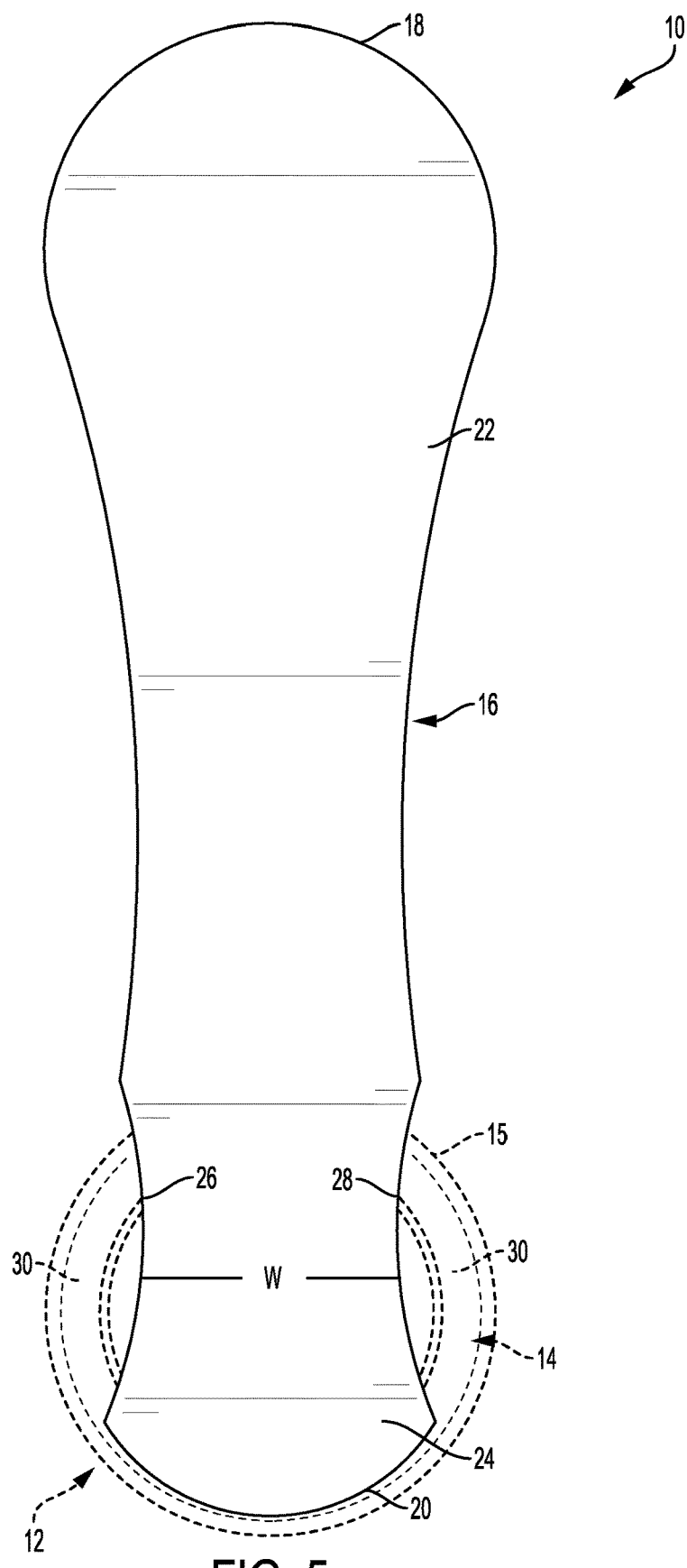
FIG. 5 is a top view of a battery assembly in accordance with an embodiment of the disclosure.
Figure 7:
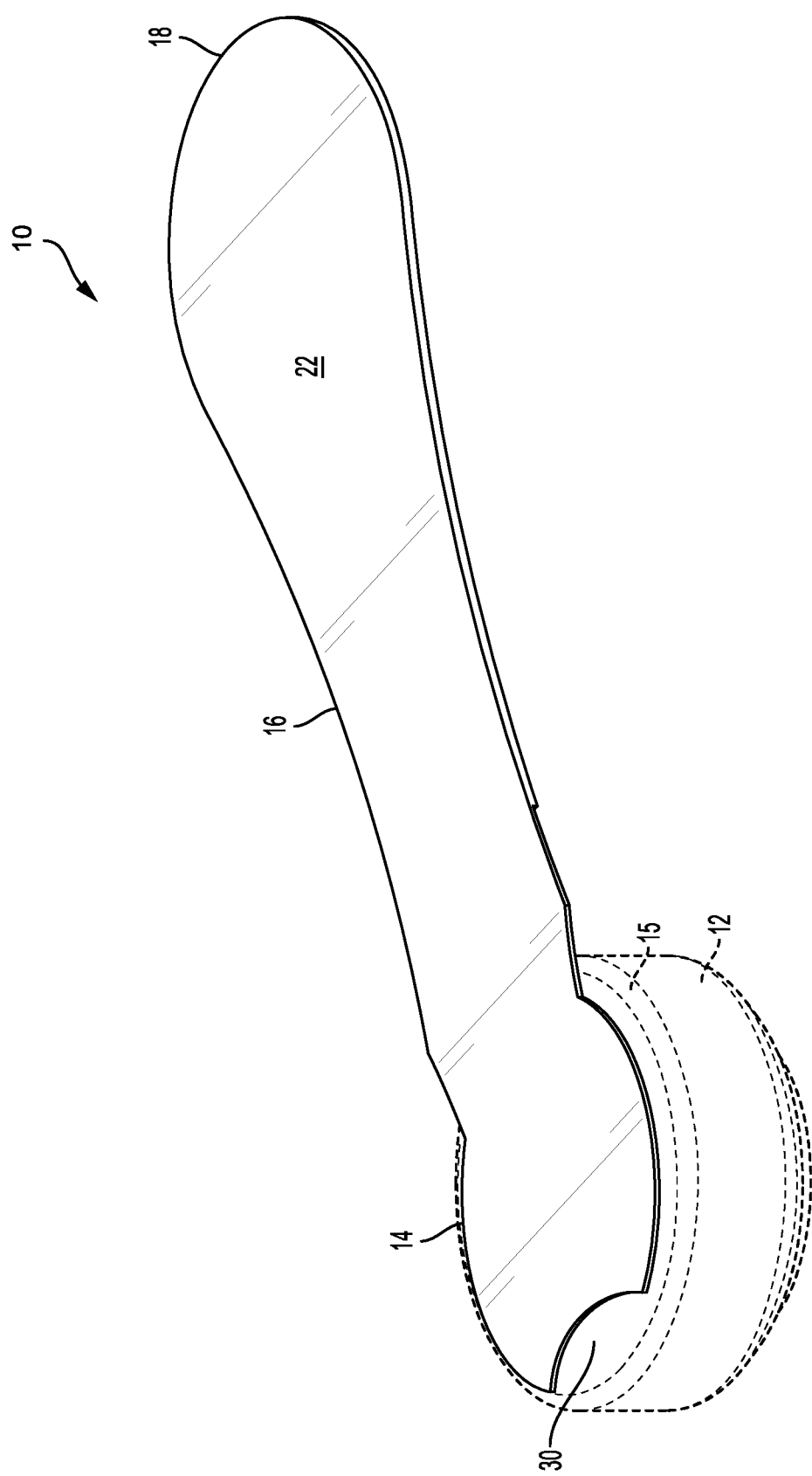
FIG. 7 is a perspective view of a battery assembly in accordance with another embodiment of the disclosure.

Referring to FIG. 5, in various embodiments, the at least one edge 26, 28, 29 is curved inwardly towards a center of the battery 12 to provide the exposed region 30. In some embodiments, the curvature of the edge 26, 28, 29 can substantially mirror the curvature of a finger, such as a thumb, when the finger is used to hold the battery in place after inserting the battery in a device such as a hearing aid. In various embodiments, as shown in the figures, both the first and second sidewalls 26, 28 are curved inwardly to provide two exposed surfaces 30 of the battery 12. Referring to FIG. 7 illustrates an embodiment in which an end edge 29 of the tab is curved inwardly toward the center of the battery. For example, the radius of curvature of the first and/or second edge 26, 28, 29 can be about 0.1 mm to about 10 mm, about 1 mm to about 5 mm, about 6 mm to about 10 mm, about 0.1 mm to about 1 mm, about 1 mm to about 8 mm, and about 0.3 mm to about 1.5 mm. Other suitable radius of curvature include about 0.1, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.5, and 10 mm. Where both the first and second side edges 26, 28 are disposed inwardly to expose a portion 30 of the top surface 14, the first and second side edges 26, 28 can have the same or different radii of curvature. Similarly, where the end edge 29 and one or both of the side edges 26, 28 are curved inwardly, the can have the same or different radii or curvature.

About 5% to about 75% of the top surface 14 of the battery 12 can be exposed, with the remaining portion of the top surface 14 being covered by the removable tab 16. Other suitable amounts of exposed top surface 30 include about 10% to about 70%, about 15% to about 60%, about 5% to about 10%, about 10% to about 20%, about 5% to about 50%. For example, about 5, 10, 15, 20, 25, 30, 35, 40, 45, 50, 55, 60, 65, 70, or 75% of the battery top surface 30 can be exposed. The amount of exposed top surface 30 can depend in part, for example, on the type and size of battery. For example, the amount of exposed top surface 30 in metal/air batteries, which include holes (not shown) in the top surface 14 that must be covered by the removable tab 16, may be dictated by the size and arrangement of the holes on the top surface 14.

Referring to FIG. 4, the overall length L of the tab 16 can vary depending on the size of the battery 12 to which the tab 16 is to be attached. In general, the removable tab 16 can have a length of about 8 mm to about 40 mm, about 8 mm to about 15 mm, about 22 mm to 30 mm, about 25 mm to 35 mm, about 20 mm to 25 mm, and about 30 mm to about 35 mm. Other suitable lengths include, for example, about 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40 mm.

The battery cell attachment region 24 can have any suitable length $L_b$ depending on the battery size to which the removable tab 16 is to be attached. In general, the battery cell attachment region 24 can have a length $L_b$ that corresponds to the diameter D of the battery 12 (illustrated in FIG. 6) to which it is attached. As examples, common hearing aid battery diameters include about 5.8 mm, 7.9 mm, and 11.6 mm. The battery cell attachment region 24 can have substantially the same or the same lengths in various embodiments. In some embodiments, the battery cell attachment region 24 can extend in a parallel direction to the top surface 14 past the circumferential edge 15 of the top surface 14 of the battery 12, such that the length of the battery attachment region 24 is longer than the diameter of the battery 12 to which it is attached or adapted to be attached, so as to further facilitate application of a peeling force to the battery cell attachment region 24 by twisting and/or pulling the removable tab 16 via the gripping region 22 while concurrently holding the battery 12 in place in a device such as a hearing aid by applying pressure to the exposed top surface 30. In general, the battery cell attachment region 24 can have a length of about 4 mm to about 15 mm, about 5 mm to about 10 mm, about 5.5 mm to about 12 mm, about 4 mm to about 8 mm, and about 10 mm to about 15 mm. Other suitable lengths include about 4, 5, 6, 7, 8, 9, 10, 11, 12, 13, 14, and 15 mm.

Referring again to FIG. 5, the battery cell attachment region 24 can have a width W, as measured by a straight line extending from a center point of the first edge 26 to a center point of the second edge 28 of about 0.2 to about 10 mm, about 0.5 mm to about 10 mm, about 0.7 to about 5 mm, about 1 mm to about 9 mm, about 2 mm to about 8 mm, about 4 mm to about 6 mm, about 5 mm to about 10 mm, or about 0.5 mm to about 6 mm. Other suitable widths include about 0.2, 0.3, 0.4, 0.5, 0.6, 0.7, 0.8, 0.9, 1, 2, 3, 4, 5, 6, 7, 8, 9, and 10 mm. In the illustrated embodiment, the width is measured from a center point of curvature of the first edge 26 to a center point of curvature of the second edge 28.

Turning back to FIG. 4, the length $L_g$ of the gripping region 22 can also vary depending on the size of the battery to which the removable tab 16 is attached or adapted to be attached. For example, the gripping region 22 can have a length of about 2 mm to about 35 mm, about 2 mm to about 9 mm, about 4 mm to about 20 mm, about 10 mm to about 35 mm, about 15 mm to about 30 mm, about 10 mm to about 20 mm, about 15 mm to about 20 mm about 10 mm to about 15 mm, about 12 mm to about 18 mm, and about 13 mm to about 17 mm. Other suitable lengths include about 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, and 35 mm.

For example, if the removable tab 16 is applied to a 675 size battery cell, the gripping region 22 can have a length $L_g$ as measured from the circumferential edge 15 of the battery 12 of about 12.7 mm to about 19.1 mm, or about 15.9 mm to the first tab end 18. In another example embodiment, the tab 16 can be applied to a smaller size button cell such as a size 10 (which has a 5 mm diameter and a 3.5 mm height) or a size 13 (having a 7 mm diameter and 5 mm height) cell. The removable tab 16 can have the same gripping region length as for a 675 size cell, for example. Different removable tab lengths can also be provided.

In the embodiments shown in the figures, the gripping region is directly adjacent to the battery cell attachment region 24 and extends outwardly from the circumferential edge of the battery 12. It is also contemplated herein that the gripping region begins some distance away from the circumferential edge of the battery, for example, where the battery cell attachment region extends beyond the circumferential edge of the battery as described above. It is also contemplated herein that an intermediate region can be provided between the battery cell attachment region 24 and the gripping region 22.

The removable tab 16 can have a thickness of about 0.1 mm to about 1 mm, about 0.5 m to about 0.9 mm, about 0.2 mm to about 0.8 mm, about 0.4 mm to about 1 mm, about 0.3 mm to about 0.7 mm, or about 0.1 mm to about 0.5 mm. Other suitable thicknesses include about 0.1, 0.2, 0.3, 0.4, 0.5, 0.6, 0.7, 0.8, 0.9 and 1 mm.

The removable tab 16 can include any suitable materials or laminates. For example, the removable tab 16 can include thermoplastic materials. In an embodiment, the removable tab 16 can include a material selected from the group consisting of biaxially-oriented polypropylene, polypropylene, polyethylene terephthalate, biaxially-oriented polyethylene terephthalate, polyester, polyolefin, polyethylene, and coextrusions, laminates, and other combinations thereof. Any number of layers can be included in a laminate, such as adhesive layers, tie layers, print layers, strength or rigidity enhancing layers, foam layers, and combinations thereof. For example, a removable tab 16 can have a laminate structure as described in U.S. Pat. No. 6,329,095, the disclosure of which is incorporated herein by reference.

In an embodiment, the removable tab 16 can include an adhesive in the battery cell attachment region 24 for attaching the tab 16 to the top surface 14 of the battery 12. In some embodiments, the adhesive can extend into the gripping region 22 and can be covered by a second layer, such as a kill tape (not shown), disposed over all or only a portion of the gripping region 22. Suitable adhesives include but are not limited to pressure-sensitive adhesives, such as acrylic-based pressure-sensitive adhesives.

In use, a consumer can grip the battery assembly at the gripping region 22 of the removable tab 16 and insert the battery assembly 10 into the battery compartment. The consumer can then apply a peel force to remove the removable tab 16, while applying pressure on the exposed portion 30 of the top surface 14 of the battery 12 that is disposed between the edge 26, 28, 29 of the removable tab 16 and the circumferential edge 15. The ability to apply pressure to the top surface 14 of the battery directly, for example, using one's finger, advantageously allows the consumer to stabilize the battery 12 in position in the battery compartment while applying the peel force to remove the tab 16 and without interfering with the removal of the tab by having to also depress on a portion of the tab, as with conventional battery tabs.

In various embodiments, the removable tab 16 can be provided with a texturization layer or coating in the gripping region. For example, the removable tab can have a coating or additional material layer applied to the top or bottom surface of the main tab material in at least the gripping region 22. The texturized coating or layer can have an average surface roughness of about 0.6 microns to about 6 microns, about 0.8 microns to about 1.8 microns, about 1 micron to about 2 microns, about 0.7 microns to about 1.2 microns, about 0.8 microns to about 1 micron, about 0.6 microns to about 1.5 microns, or about 1.5 microns to about 2 microns. Other suitable roughness includes about 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9. 5, 5.1, 5.2, 5.3, 5.4, 5.5, 5.6, 5.7, 5.8, 5.9, and 6 microns.

EXAMPLES

Figure 8A:
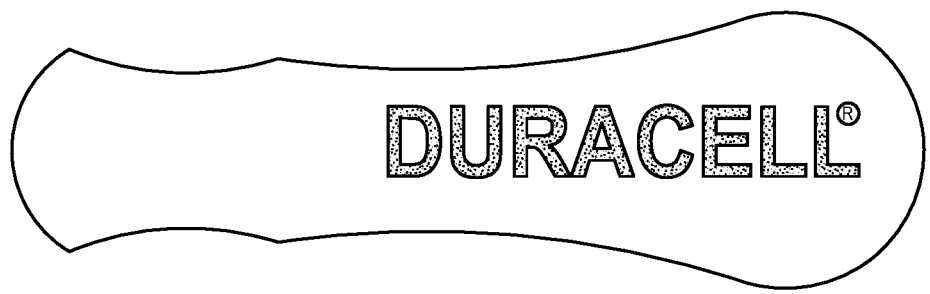
FIG. 8A is a top view of a battery tab in accordance with an embodiment of the disclosure and FIG. 8B is a bottom view of the tab.
Figure 8B:
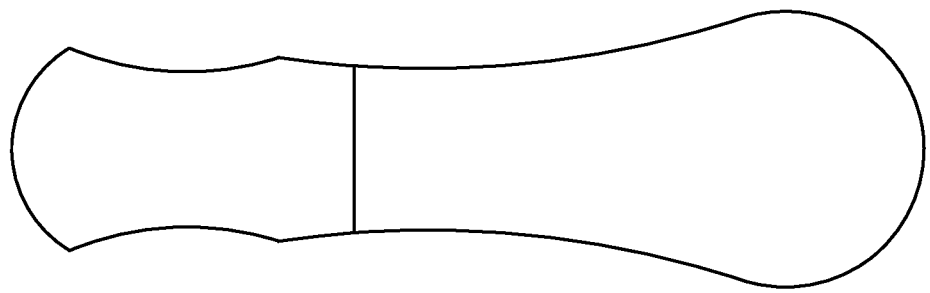

Six size 312 battery cell tabs in accordance with embodiments of the disclosure were made. FIGS. 8a and 8b are photographs of one of these tabs. The tab dimensions are provided in Table 1 below.

TABLE 1

| | Size 312 Battery Cell | | | | | |
|---|---|---|---|---|---|---|
| Cell | $L_1$-Adhesive length (mm) | $L_2$-Non-adhesive length (mm) | $L_T$ Total Tab length (mm) | $W_T$ Tab width (mm) | $W_1$ - Cell width - widest (mm) | $W_2$ - Cell width - narrowest (mm) |
| 1 | 9.50 | 16.00 | 25.44 | 7.62 | 5.58 | 4.22 |
| 2 | 9.53 | 16.07 | 25.45 | 7.61 | 5.53 | 4.31 |
| 3 | 9.59 | 15.90 | 25.46 | 7.65 | 5.64 | 4.49 |
| 4 | 9.73 | 15.84 | 25.53 | 7.6 | 5.55 | 4.33 |
| 5 | 9.66 | 15.93 | 25.51 | 7.7 | 5.52 | 4.43 |
| 6 | 9.72 | 15.93 | 25.51 | 7.73 | 5.45 | 4.09 |
| Avg. | 9.62 | 15.95 | 25.48 | 7.65 | 5.55 | 4.31 |
| Std. Dev. | 0.10 | 0.08 | 0.04 | 0.05 | 0.06 | 0.14 |

Figure 9A:
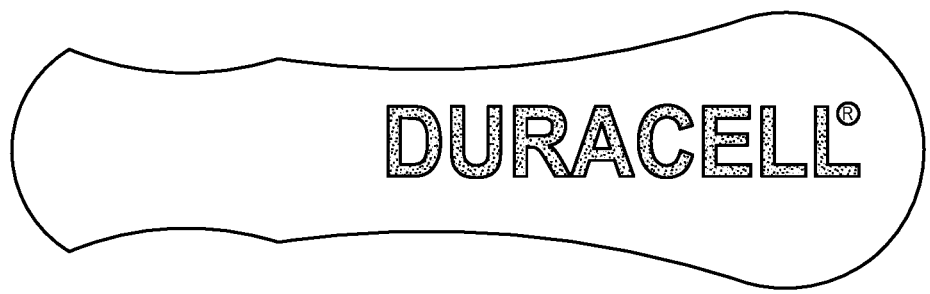
FIG. 9A is a top view of a battery tab in accordance with an embodiment of the disclosure and FIG. 9B is a bottom view of the tab.
Figure 9B:
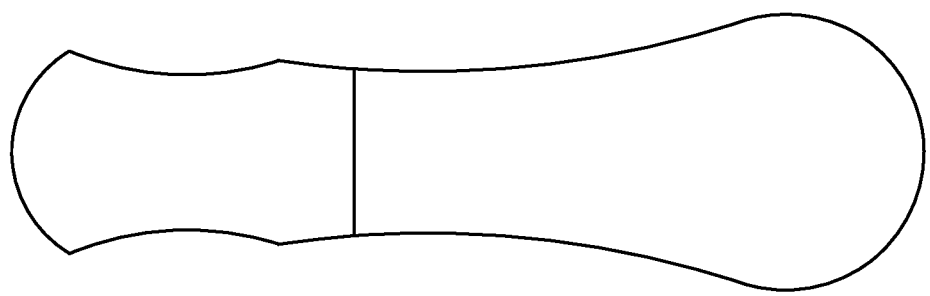
Figure 10A:
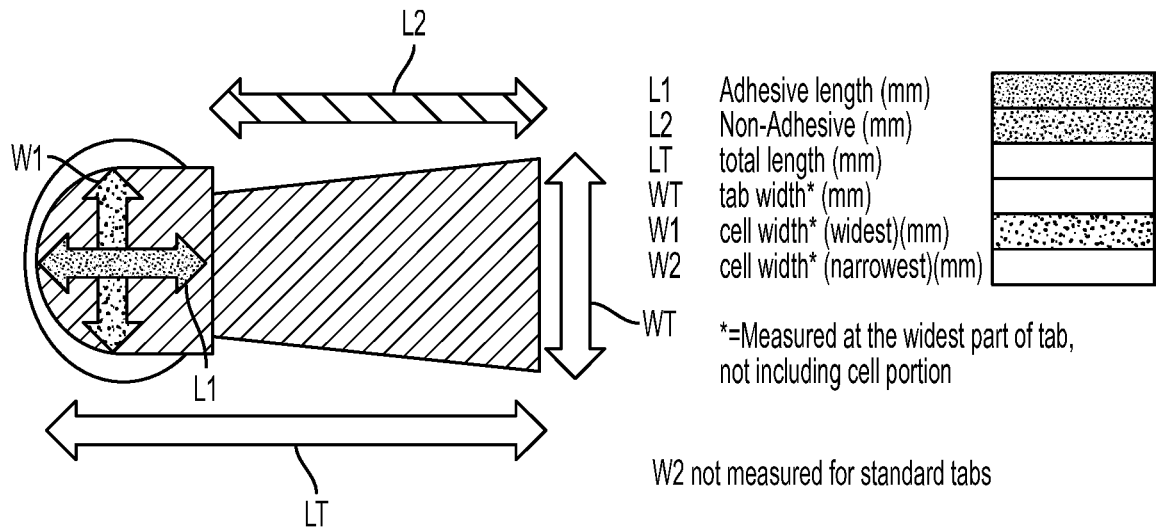
FIG. 10A is a schematic illustration of a conventional battery tab and FIG. 10B is a schematic illustration of a tab in accordance with an embodiment of the disclosure, illustrating various dimensions of the tab.
Figure 10B:
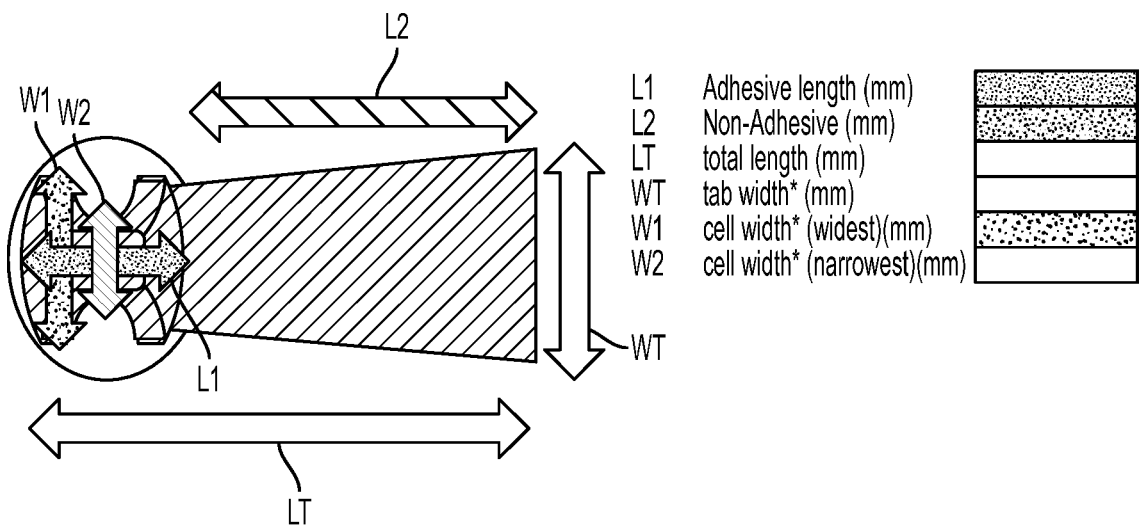

Six size 13 battery cell tabs in accordance with embodiments of the disclosure were made. FIGS. 9a and 9b are photographs of one of these tabs. The tab dimensions are provided in Table 2 below. FIG. 10A illustrates the location of the dimensions listed in Tables 1 and 2 for a conventional battery cell, and FIG. 10B illustrates the location of the dimensions listed in Tables 1 and 2 for a tab in accordance with the disclosure.

TABLE 2

| | Size 13 Battery Cell | | | | | |
|---|---|---|---|---|---|---|
| Cell | $L_1$-Adhesive length (mm) | $L_2$-Non-adhesive length (mm) | $L_T$ Total Tab length (mm) | $W_T$ Tab width (mm) | $W_1$ - Cell width - widest (mm) | $W_2$ - Cell width - narrowest (mm) |
| 1 | 9.41 | 16.15 | 25.56 | 7.67 | 5.46 | 4.32 |
| 2 | 9.62 | 16.18 | 25.54 | 7.69 | 5.43 | 4.36 |
| 3 | 9.78 | 16.18 | 25.44 | 7.7 | 5.46 | 4.3 |
| 4 | 9.46 | 16.3 | 25.54 | 7.59 | 5.51 | 4.38 |
| 5 | 9.42 | 16.23 | 25.52 | 7.71 | 5.5 | 4.32 |
| 6 | 9.41 | 16.12 | 25.49 | 7.64 | 5.42 | 4.27 |
| Avg. | 9.52 | 16.19 | 25.52 | 7.67 | 5.46 | 4.33 |
| Std. Dev. | 0.15 | 0.06 | 0.04 | 0.05 | 0.04 | 0.04 |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any embodiment disclosed or claimed herein or that it alone, or in any combination with any other reference or references, teaches, suggests or discloses any such embodiment. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed:

1. A battery assembly, comprising:
    a battery comprising a top surface surrounded by a circumferential edge; and
    a removable tab attached to battery, the removable tab comprising:
    a first tab end, an oppositely disposed second tab end, and first and second oppositely disposed sidewalls between the first tab end and the second tab end;
    a gripping region disposed adjacent to the first tab end, the gripping region being located outside of the circumferential edge of the battery; and
    a battery cell attachment region disposed adjacent to the second tab end, the battery cell attachment region being directly attached to the top surface of the battery within the circumferential edge of the battery, the battery cell attachment region including an end edge of the second tab end that is curved inwardly away from the circumferential edge of the battery, while attached to the top surface of the battery, such that a portion of the top surface of the battery is exposed between the second tab end and the circumferential edge of the battery.

2. The battery assembly of claim 1, wherein about 5% to about 75% of the top surface of the battery is exposed and the remaining portion of the top surface is covered by the removable tab.

3. The battery assembly of claim 1, wherein the second tab end has a radius of curvature of about 0.1 m to about 10 mm.

4. The battery assembly of claim 1, wherein the gripping region has a length of about 10 mm to about 35 mm.

5. The battery assembly of claim 1, wherein the battery cell attachment region has a width of about 0.2 mm to about 10 mm.

6. The battery assembly of claim 1, wherein the removable tab has a total length of about 8 mm to about 40 mm.

7. The battery assembly of claim 1, wherein the removable tab comprises a material selected from the group consisting of biaxially-oriented polypropylene, polypropylene, polyethylene terephthalate, biaxially-oriented polyethylene terephthalate, polyester, polyolefin, polyethylene, and coextrusions, laminates, and other combinations thereof.

8. The battery assembly of claim 1, further comprising a layer of an adhesive disposed between the battery cell attachment region and the top surface of the battery.

9. The battery assembly of claim 8, wherein the adhesive extends onto the gripping region and the adhesive in the gripping region is covered by a kill tape.

10. The battery assembly of claim 1, wherein the removable tab has a thickness of about 0.1 mm to about 1 mm.

11. The battery assembly of claim 1, wherein the battery is a metal/air battery and comprises air holes in the top surface, and the battery cell attachment region is disposed over and covers the holes.

12. The battery assembly of claim 11, wherein the metal/air battery is a zinc/air button cell.

13. The battery assembly of claim 1, wherein the distance between second tab end to the circumferential edge is about 0.1 mm to about 10 mm.

14. The battery assembly of claim 1, wherein a portion of the battery cell attachment region extends in a parallel direction beyond the top surface of the battery.

15. A method of using the battery assembly of claim 1, comprising:
    gripping the battery assembly by the gripping region of the removable tab;
    inserting the battery assembly into a battery compartment;
    removing the removable tab by applying a peeling force to the battery cell attachment region while applying pressure on the portion of the top surface of the battery exposed between second tab end and the circumferential edge.

16. The method of claim 15, wherein pressure is applied by a user's fingertip.

17. A removable tab, comprising:
    a first tab end and an oppositely disposed second tab end;
    a gripping region disposed adjacent to the first tab end;
    a battery cell attachment region disposed adjacent to the second tab end, the battery cell attachment region being adapted to be attached to a top surface of a battery, wherein the battery cell attachment region includes an end edge of the second tab end that is curved inwardly away from a circumferential edge of the battery such that a portion of a top surface of the battery is exposed between the second tab end and a circumferential edge of the battery when the battery cell attachment region is attached to the top surface of the battery.

18. The removable tab of claim 17, wherein the second tab end has a radius of curvature of about 0.1 mm to about 10 mm.

19. The removable tab of claim 17, wherein the gripping region has a length of about 10 mm to about 35 mm.

20. The removable tab of claim 17, wherein the battery cell attachment region has a width of about 0.2 mm to about 10 mm.

* * * * *